United States Patent
Rackley, III et al.

(10) Patent No.: US 10,922,746 B2
(45) Date of Patent: Feb. 16, 2021

(54) SYSTEM AND METHOD FOR SCORING THE FIT OF A VEHICLE FOR A GIVEN FLIP REQUEST

(71) Applicant: CLUTCH TECHNOLOGIES, LLC, Atlanta, GA (US)

(72) Inventors: Brady L. Rackley, III, Atlanta, GA (US); John R Phelps, Atlanta, GA (US); Adam J. Carley, Sandy Springs, GA (US); Vincent G. Zappa, Atlanta, GA (US); Steven S. Neel, Suwanee, GA (US); Sangameswar Venkatraman, Atlanta, GA (US); Kyle L. Clements, Atlanta, GA (US); Stuart H. Childs, Atlanta, GA (US); James F. Heller, Atlanta, GA (US)

(73) Assignee: CLUTCH TECHNOLOGIES, LLC, Atlanta, GA (US)

( * ) Notice: Subject to any disclaimer, the term of this patent is extended or adjusted under 35 U.S.C. 154(b) by 0 days.

(21) Appl. No.: 15/267,144

(22) Filed: Sep. 16, 2016

(65) Prior Publication Data
US 2017/0069016 A1    Mar. 9, 2017

Related U.S. Application Data

(63) Continuation-in-part of application No. 14/847,881, filed on Sep. 8, 2015, now abandoned.

(60) Provisional application No. 62/046,813, filed on Sep. 5, 2014.

(51) Int. Cl.
G06Q 30/06    (2012.01)
G06F 7/02     (2006.01)

(52) U.S. Cl.
CPC ........ *G06Q 30/0645* (2013.01); *G06F 7/026* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 5,754,850 A | * | 5/1998 | Janssen | G06F 17/3053 700/214 |
| 2007/0198311 A1 | * | 8/2007 | Menendez | G06Q 10/02 705/5 |
| 2016/0364783 A1 | * | 12/2016 | Ramanuja | G06Q 30/0631 |

OTHER PUBLICATIONS

The Design of Web Based Car Recommendation System using Hybrid Recommender Algorithm, Thomas et al., International Journal of Engineering and Technology, 5 pages total, 2019 (Year: 2019).*

* cited by examiner

*Primary Examiner* — Dennis W Ruhl
(74) *Attorney, Agent, or Firm* — Smith Tempel Blaha LLC; Gregory Scott Smith (57) ABSTRACT

In a subscription vehicle system that enables customers to select and swap between a fleet of available vehicles, the vehicles are evaluated to identify which vehicles would be the best fit in view of a customer request and other information pertaining to the customer. The customer request and information is examined to identify particular attributes that are being sought. Based on these attributes, the available vehicles are assigned a score that reflects the level of satisfaction that the vehicle is anticipated to provide for the customer. The vehicles with the highest scores can be considered as candidates for fulfilling the customer request.

8 Claims, 3 Drawing Sheets

SYSTEM AND METHOD FOR SCORING THE FIT OF A VEHICLE FOR A GIVEN FLIP REQUEST

CROSS-REFERENCE TO RELATED APPLICATIONS

This application is a continuation-in-part of U.S. application Ser. No. 14/847,881 filed on 2015 Sep. 8, which application is incorporated herein in its entirety and is also related to and is being filed concurrently with the following United States applications for patent, each of which are herein incorporated by reference in their entirety:

LEARNING AGENT THAT FACILITATES THE EXECUTION OF A SUBSCRIPTION VEHICLE SERVICE BY DYNAMICALLY GENERATING MESSAGES AND PROCESSING RESPONSES TO GENERATE AND AUGMENT DATA THAT CAN THEN BE USED IN SUGGESTIONS TO CUSTOMERS, filed on Sep. 16, 2016 and assigned Ser. No. 15/267,150;

LEARNING AGENT THAT FACILITATES THE EXECUTION OF A SUBSCRIPTION VEHICLE SERVICE BY IDENTIFYING VEHICLE SUGGESTIONS OR SUGGESTIONS THAT A CUSTOMER SWAP BASED ON DYNAMICALLY GATHERED INFORMATION, filed on Sep. 16, 2016 and assigned Ser. No. 15/267,145.

SYSTEM AND METHOD FOR ALLOCATING VEHICLES ACROSS A POOL OF CUSTOMERS IN A SUBSCRIPTION VEHICLE SERVICE, filed on Sep. 16, 2016 and assigned Ser. No. 15/267,148.

BACKGROUND

The parent application to this disclosure addresses a need in the art for a system and a method of controlling risks, administering assets, scheduling operations, and providing highly personalized customer service for a service offering subscription vehicle access. As one of ordinary skill in the art would expect, a provider of a subscription vehicle service, as well as a client to a subscription vehicle service, may have a need for an artificially intelligent capability for identifying and evaluating vehicle suggestions for customers.

In a subscription vehicle service system, members are able to switch from one vehicle to the next based on their individual wants, desires, needs, etc. Each time a member requites a new vehicle, this is referred to as a flip or swap request. The United States patent applications incorporated by reference above describe details in the generation of vehicle suggestion lists in response to a flip request from a customer. However, it should be understood that in selecting various vehicles for the vehicle suggestion list, certain vehicles are more desirable, more useful and more responsive to a particular request than other vehicles. Or stated otherwise, some vehicles are a better fit than others.

Therefore, there is a need in the art for a system and method of scoring potential vehicles based on the fit of the vehicle for a particular flip request.

SUMMARY OF THE DISCLOSURE

Various embodiments of methods and systems for evaluating and ranking potential vehicles to be paired to a customer that is requesting a vehicle or an exchange of vehicles in a subscription vehicle system. The embodiments operate to gather information from a customer request and/or a customer profile in order to identify requested and desired attributes for a requested vehicle. A pool of available vehicles can be filtered by various criteria, such as if the vehicle is within a threshold period of time for requiring maintenance, if a particular vehicle is highly suited for being paired to a different customer, as well as other filtering parameters. For each vehicle that is not filtered, the embodiments may operate to assign a score to the vehicle. The score operates as an indicator of how applicable the vehicle is given the customer's request, timing, needs, intended uses, previous driving habits and patterns, etc. The scores can then be used as sorting, filtering or selection criteria to cull the list of potential vehicles down to one or a few vehicles that have an acceptable score or fit.

An exemplary embodiment includes a program executed on a computer system that operates to rank the pairings of vehicles selected from a fleet with a requesting customer. The exemplary method includes receiving a vehicle request from the requesting customer. Among other things, the received request may include or identify vehicle attributes (requested vehicle attributes). Further, each customer may have a customer specific profile that identifies vehicle attributes that are desired by the customer (desired vehicle attributes). The exemplary embodiment can operate to identify vehicles from a pool of available and/or anticipated to be available vehicles that include attributes that are common with the requested and/or desired vehicle attributes. These vehicles can then be identified as potential pairings with the customer.

In some embodiments, additional filtering may be applied to cull the domain of potential vehicles down. For instance, if a vehicle is due for a maintenance procedure within a threshold period of time, the vehicle may be removed from the domain of potential vehicles. More specifically, as a non-limiting example, if the customer request indicates that the customer will need the vehicle for a specific period of time and the maintenance requirements for that particular vehicle would fall within that period of time, then the vehicle may be filtered.

The exemplary embodiments then operate to assign a score to the various potential vehicles. The score operates as an indicator of the alignment or "fit" of the particular vehicle in view of the customer request and/or the customer's desires as presented in the profile. Thus, the score can be based at least in part on the level of commonality between the desired vehicle attributes and the requested vehicle attributes with the actual attributes of the particular vehicle.

Further filtering can be applied after generating the scores by eliminating vehicles that do not have a minimum amount of vehicle attribute commonality with the desired vehicle attributes and the requested vehicle attributes (i.e., that have a score below a threshold level).

In some embodiments, the score can be based on value attributes, which are weighted attributes generated based on the customer request and/or profile information. Thus, some attributes may be identified as being more important than other attributes. In such embodiments, the score may thus be based on the value attributes or the weighting that is attributed to the various attributes. As a non-limiting example, the customer request and/or profile may indicate that fuel efficiency is very important to a customer but, the color of the vehicle has little importance. In such a scenario, a red car with high fuel efficiency may have a similar score as a white vehicle with high fuel efficiency. However, if the color of the vehicle is identified as being important to the customer, the same red car may have a higher score than the white car. Similarly, if color is listed as the most important attribute and fuel efficiency is of secondary importance, then a red car with lower fuel efficiency may have a higher score than a white care with higher fuel efficiency. Thus, in various embodiments, the value attributes may be assigned a value based on the importance of the attribute as reflected in the requested vehicle attributes and the desired vehicle attributes.

In the various embodiments, the assigned score may also take into consideration information obtained from sources other than the customer request and/or profile. For instance, vehicle telematics data pertaining to the customer may be considered, driving records, scheduling information obtain from a customers calendar, information from social media profiles, etc. Further, the status of the vehicle as reflected in telematics (location) information may also be taken into account. For instance, the telematics data or other records may indicated that progression through maintenance and preparation processes. For example, determining if a vehicle is on-schedule in returning from a previous swap.

Other embodiments, as well as features, aspects and functionality of the embodiments are further presented in the detailed description and the drawings.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. The specific letter character designation "N" or "n" is meant to indicate that the particular element is not limited to any specific quantity. Letter character designations for reference numerals may be omitted when it is intended that a reference numeral to encompass all parts having the same reference numeral in all Figures.

DETAILED DESCRIPTION

The present application presents embodiments, as well as features, aspects, functionality, etc., of a technique for evaluating the fit of certain vehicles in view of a request for a new vehicle in a subscription vehicle service. The subscription vehicle service, which is the subject of various patent applications by the same applicant as the present disclosure, in general implements a service of providing vehicles selected from a fleet of vehicles, to customers of the service. The customer may request a vehicle (such as an initial request for a first vehicle or an additional vehicle) or request a vehicle flip (which is an exchange of one vehicle for another). In response to such a request, the system analyzes the request in view of the profile and a domain of available vehicles and generates a vehicle suggestion list comprising one or more vehicles. The one or more vehicles are selected based at least in part on an association between attributes of the vehicle and the metrics that the system generates based on the customer's profile and other information. Further, the system is described as, in response to receiving a rejection of the vehicle suggestion list, operating to initiate a campaign to obtain further information, augmenting the profile of the customer to include the results of the campaign and then generating new metrics based on the updated information. However, in response to receiving a selection of a vehicle from the vehicle suggestion list, the system operates to initiate the delivery of the selected vehicle to the user and augment the profile of the customer to reflect the success of the selection.

The present disclosure focuses on the ability to evaluate the potential vehicles to be included in the suggest list and assign a score to each potential vehicle. The score operates as an indicator of how applicable the vehicle is given the customer's request, timing, needs, intended uses, previous driving habits and patterns, etc. The scores can then be used as sorting, filtering or selection criteria to cull the list of potential vehicles down to one or a few vehicles that have an acceptable score or fit.

Definitions.

The term "exemplary" is used herein to mean serving as an example, instance, or illustration. Any aspect described herein as "exemplary" is not necessarily to be construed as preferred or advantageous over other aspects.

The term "application" may include files having executable content, such as: object code, scripts, byte code, markup language files, and patches. In addition, an "application" referred to herein, may also include files that are not executable in nature, such as documents that may need to be opened or other data files that need to be accessed.

The term "content" may include files having executable content, such as: object code, scripts, byte code, markup language files, and patches. In addition, "content" referred to herein, may also include files that are not executable in nature, such as documents that may need to be opened or other data files that need to be accessed.

The terms "component," "database," "module", service," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device (a "PCD") may include a cellular telephone, a pager, a PDA, a smartphone, a navigation device, or a hand-held computer with a wireless connection or link.

A "subscription" is an account with the service. A "subscriber" or "client" is a named person who has entered into a contract for service and is listed on the account. A "driver"

or "named driver" is a person that has been approved by the service to drive one or more vehicles associated with the account on a habitual basis or for an extended period of time. A subscription may have multiple drivers listed on the account. A subscription account may have one or more vehicles assigned to it at any period in time. Each driver may be approved to drive one, some or all of the vehicles assigned to the account.

A "predictive feature" or "feature" is defined as, in the practice of machine learning and pattern recognition, an individual measurable property of a phenomenon being observed. Choosing informative, discriminating and independent features may be a crucial step for effective algorithms in pattern recognition, classification and regression. Features are usually numeric, but structural features such as strings and graphs are used in syntactic pattern recognition. The concept of a "feature" is related to that of a "dependent variable" (or "explanatory variable") used in statistical techniques such as linear regression.

The term "possession" is used herein to denote the period of time when a vehicle is assigned to a subscriber or client and is in the custodianship of that subscriber or client. This concept is distinct from "rental" for at least the reason that when a vehicle is rented, the amount paid is a function of the time that the subscriber has the car. Under a subscription service, the payment may comprise a flat fee that does not depend on either the duration of possessions or the frequency of swaps.

The present disclosure, which should be viewed with reference to the above-incorporated parent and related applications, generally relates to the provision of a vehicle fit score within a system for and a method of administering assets and scheduling operations for a service offering subscription vehicle access. More specifically, exemplary embodiments relate to a system for and a method of evaluating a vehicle in view of a wide variety of parameters and circumstances to generate a score that is indicative of the fit of a particular vehicle for a particular flip request from a customer.

Subscription Vehicle System Description

Figure 1:
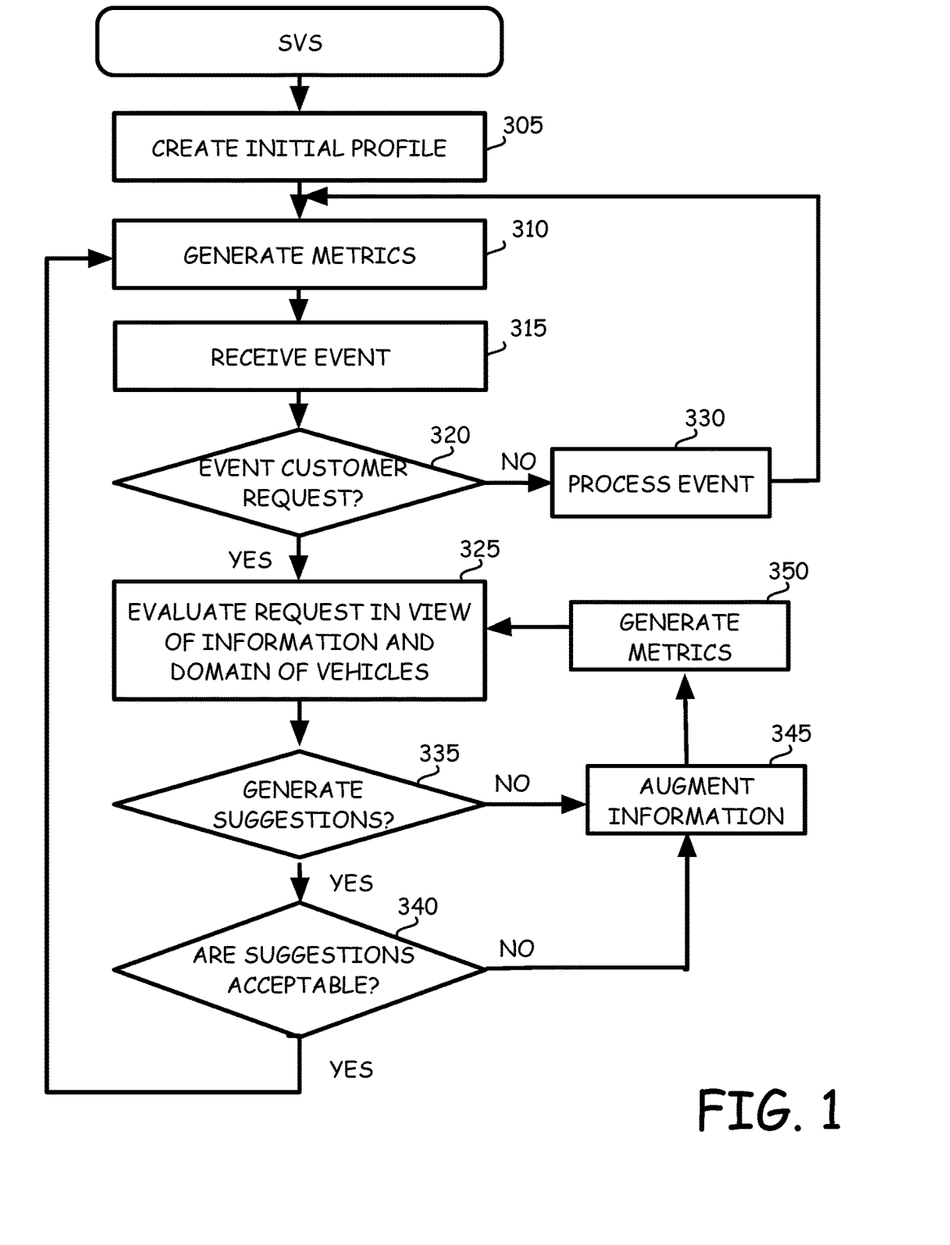
FIG. 1 is a high-level flow diagram illustrating an exemplary process for the dynamic information based subscription vehicle service.

FIG. 1 is a high-level flow diagram illustrating an exemplary process for the dynamic information based subscription vehicle service. Initially, a profile is created 305. Generally, when a new customer subscribes to the subscription vehicle service, the new customer is presented with a set of questions about a variety of topics, such as their household demographics, lifestyle, personality characteristics (likes, dislikes and elements to which they are indifferent), driving characteristics, vehicle requirements, commuting demographics (daily, monthly, annually etc.), storage requirements (garage size, parking deck restrictions) and income ranges as a few non-limiting examples. This information can be collected during the sign-up process or, portions or all of the information can be collected or provided at a later time. The customer can enter this information through an internet browser, mobile smart phone, tablet, etc. that the customer is using to access the subscription vehicle service system ("SVS"), or through a or a resident application that accesses the SVS from a mobile device or computing system. The customer may provide structured inputs (e.g. in a form) or may provide unstructured/natural language that the system/SVS can interpret and analyze. The SVS is a computing environment that houses and runs the subscription vehicle service. The SVS receives the information from the customer and populates a profile that houses the information about the account and the users that are associated with the account.

The SVS accesses the information that is incorporated into the profile and generates metrics 310. Among other things, the metrics include value attributes for various categories of information and use cases. The value attributes can best be understood by way of example. As a non-limiting example, if a customer does not provide a vehicle color preference, the value attribute for the color of a suggested vehicle may be low or zero. As another non-limiting example, if the household demographics indicate that the customer has a large family, such as a spouse and 3 kids, the value attribute for vehicles with seating availability of 5 or more passengers may have a high value. Further, it should be appreciated that the attribute values may be multifaceted and taking several parameters into consideration. As a non-limiting example, suppose a customer has a large family and also owns a minivan. A value attribute for lower occupancy capacity may be set to a high value for vehicle requests that are directed towards daily work commutes but, for a lower value for requests that are directed towards weekend travels. It should be appreciated that a seemingly endless number of metrics could be considered in various implementations of the SVS, and that the SVS incorporates artificial intelligence, at least in the forms of heuristics and algorithms to dynamically identify and create various value attributes as the information available expands, contracts and changes. Further, it will be appreciated that the value attributes operate to define the profile information in terms of factors such as specificity, fit with actual behavior and recency, and that try to quantify normally intangible aspects of the customer's relationships with the SVS such as the customer's level of trust, desire for control and satisfaction. Thus the value attributes can include a canned number of common value attributes, such as the non-limiting example in TABLE 1.

TABLE 1

Example of Attribute and Assigned Values

| Attribute | Profile Information | Value Attribute |
|---|---|---|
| Color | White, black, tan | 80 |
| Number of doors | 4 | 100 |
| 0 to 60 rating | — | 50 |
| Occupancy | 5 | 100 |
| Safety rating | Highest | 90 |
| Fuel Efficiency | Minimum of 20 mpg | 90 |
| Handless entry | Yes | 90 |
| Storage capacity | High level | 90 |
| Rear seat DVD displays | Required | 100 |
| Convertible | No | 0 |
| Moon roof | — | 50 |
| Automatic | Yes | 100 |
| Manual | No | 0 |
| Blue Tooth Equipped | Yes | 90 |

TABLE 1 presents a simple sub-set of potential attributes and an exemplary set of information that could be present in a particular profile in view of the attributes. The process of generating the metrics 310 then applies heuristics and algorithms to associate a weighting factor with each of the attributes based on the profile information to create the value attributes with a value of 0 to 100 in the illustrated example where 0 is no value and 100 is the maximum value.

It should be appreciated that each customer may have multiple profiles for differing requests, such as a recreational profile and a professional profile.

As those skilled in the art will understand, a use case describes the behavior of the SVS as it responds to a series of related requests from a customer. The SVS generates the initial use cases based on the information received and as the information is expanded, contracted or modified, the SVS modifies and updates the use cases. As a non-limiting example of a use case, in response to a request from a customer for a vehicle, a use case may take into consideration the specific parameters of the request in view of the value attributes and other ancillary information to generate a response to the request. As is further discussed below, the response may include one or more vehicle suggestions and/or requests to the customer or other sources for additional information. Thus, in one specific example, a customer may request a vehicle for a trip to Panama City Beach Fla. for the period of time from Apr. 1 to Apr. 8, 2016. A use case may be set up to activate a trigger that indicates the requested time period coincides with the spring break for the customers children based on requests from prior years, calendar information of the customer, data mined from the website for the school system in which the customer's children are enrolled, etc. In addition, the use case may take into consideration the various value attributes of the customer and then generate a request for further information if needed. Thus, as previously mentioned, a customer may have multiple profiles but, a use case can be utilized to create the essence of multiple profiles by pooling only particular attributes from the profile information.

The SVS may include a list of use cases that serve as a pool of available use cases. As the profile information is entered and augmented, particular use cases based on the profile information can be selected for the particular profile. Additional use cases can be added to the SVS in the future, either by an operator or by being dynamically generated based on profile information of an individual, multiple customers, identified trending, etc.

In addition or alternatively, the system may initiate an information campaign to collect further information. As a non-limiting example, the SVS may send a text to the customer to confirm that the customer is taking his or her family on a spring break vacation. Further, the use cases within the profile for each customer can be displayed as a set of options through which this customer can request a swop within the SVS, such as through a mobile app. For each option the customer interface may be used to display additional details designed to convey the essence of the option (e.g. intended use case) and selected criteria that can be used for assigning a vehicle if the option is chosen (e.g. number of seats, amount of luggage). The customer interface can allow the customer to browse and select an option. When selecting an option, the customer may choose to provide additional information. Such additional information can be provided through the entry of free form text, drop down menu selection, radial button selection etc., and the information may augment or correct the details that are current presented to the customer. The customer interface may also include the ability for the customer to request a new option and describe their needs via any of a variety of input mechanisms. After selecting an option, the customer may input their desired date, time and location to receive a vehicle and submit their request. In other embodiments, the customer may request a swap via a messaging medium such as SMS, a messaging client within the SVS mobile app, or via a third party messaging app or even email, voice messaging etc. In such embodiment, the customer may reference one of the options described in the customer interface or otherwise just describe what they need using free form text.

Having a general understanding of the value attributes and use cases of the SVS, the additional processes in the flow diagram of FIG. 1 can be explored. Once the initial value attributes and use cases are generated, the SVS is armed and ready to receive and respond to an event 315. An event may take on a variety of forms and be initiated by a variety of sources or circumstances. As non-limiting examples and event may include a vehicle request from a customer, an update on the domain of available vehicles in the fleet, an alert regarding the status of a vehicle in the fleet, or simply an update of information that is generated or made available from an external source and that may have an impact on the general operation of the SVS, such as requiring an update of use cases across the SVS system or, may simply be pertinent to a subset of the SVS accounts or even a single account.

When an event is received, the SVS may operate to evaluate the type of event and respond accordingly 320. For example, if the event is a customer request, the SVS continues by evaluating the request in view of information already of record and/or that is available to the SVS, and the domain of vehicles available in the fleet 325. However, if the event is not a customer request, the event is further and processed 330 and the metrics are regenerated 310 based on the results of the event.

Events that are customer requests can include, but are not limited to, the form of a vehicle swap request, an initial request if the customer does not have a vehicle currently or a vehicle return/pick-up request. When the event is a customer request, once the request is evaluated 325 the SVS determines if one or more vehicle suggestions 335 are to be generated.

The customer request can take on a variety of forms and include a variety of information. For example, a customer request may simply convey information to the SVS that the customer wants a different vehicle. In response to such a minimalist request, the SVS relies heavily upon the profile information available, as well as the current status of the vehicle fleet to generate one or more vehicle suggestions. In other situations, the customer may include a highly detailed request, such as the make, model, year, color and features of the vehicle. In response to such requests, the SVS may focus more heavily on the current status of available vehicles in the fleet, and then augment the evaluation based on profile information if a direct match is not available. It should be appreciated then that the request can take on any of a variety of forms and thus, the SVS applies artificial intelligence is evaluating and responding to the customer request.

Further, the SVS may evaluate the information submitted via the request. This evaluation may include any "adjacent" or "ancillary" information such as messages sent proximal to the submission of the request. The SVS may also apply natural language processing and machine learning algorithms to determine whether additional information would be helpful, whether any ambiguous instructions require clarification or whether the requests contradict previously expressed preferences such that clarification would be helpful. In the event that a request is made via free text without reference to a specific option or attribute, the evaluation engine of the SVS may also evaluate whether the request maps closely to an existing option or whether it is better handled by creating a new option or attribute. The evaluation engine may take as inputs all the customer's history interacting with and using the SVS. In particular, data on the customer's current state (e.g., current vehicle's type status, and location) may also be taken into account as a non-limiting example.

Based on the operation of the evaluation engine, the SVS may initiate a task to generate the vehicle suggestions 335 or, augment the available information by initiating an event to obtain more information from the customer and/or from other sources 345. In augmenting the information, the SVS may generate one or more questions that can be conveyed to the customer via a variety of mediums, such as SMS, push notifications, messaging client or a third party messaging app as non-limiting examples. In addition or in the alternative, the SVS may generate a prompt for a SVS staff member to compose a message to the customer to gather information specified in the prompt. The SVS staff member may gather such information using a messaging medium, via a phone call and/or even face-to-face. The SVS staff member may receive such a prompt via a desktop computer in a contact center or via an application on a mobile device while working in the field. An SVS staff member may be authorized to interpret the prompt generated by the SVS and then choose to execute the prompt as provided, apply judgment in how to interpret the prompt or reject the prompt. If the responses from the customer are gathered either over the phone or face-to-face, then the SVS staff member can input the customer's response into the SVS system.

If a customer response is received by the SVS, the evaluation engine may run again to determine if the additional information is sufficient or if further information is required. If further information is required, the SVS may generate further tasks to obtain the further information. These tasks may manifest as successive questions posed to the customer using any of a variety of communication techniques as well as any of the afore-mentioned techniques as well as others. The combination of question and answers or responses may resemble a conversation. If no response is received, the SVS may operate to adjust the task so that it is executed or delivered via a different medium and/or includes different content. For instance, if an SMS does not generate a response, the SVS may initiate a call with voice prompts and voice recognition, prompt an SVS staff member to place a call, sending an email, etc. As another example, the SVS may rephrase the request in a different manner to further solicit a response, such as removing options presented for the response and requesting a free form text response instead.

Further, the process of augmenting the information may include pooling information from other customers and/or by obtaining information from other sources. As a few non-limiting examples, other information could include gas prices where a customer may be traveling, anticipated vehicle swaps from other customers, vehicle availability at other locations that a customer may be traveling to, consumer reports pertaining to particular vehicles including consumer reviews, maintenance issues, mean-time-between-failures for vehicles, predicted climate and environmental conditions at locations to be traveled to by the customer, etc.

The SVS may apply a variety of techniques in augmenting the information 345 and regenerating the metrics 350. The system can apply natural language processing and machine learning algorithms to identify what information has been collected and how to append that information to the profile of the customer. The SVS may operate to extract one or more keywords, each of which may be used to generate attribute values, which could be based on the relevance and sentiment associated with the keywords or other weighting. For example, one or more keywords may be determined to pertain to a particular persistent topic, such as preference given to vehicle color or style, and that information and value attributes can be appended to the profile information related to such topics. Keywords that do not fall into a persistent topic may be added as a general entry in the profile information or may be clustered to identify emerging topics. They SVS can append information to the profile at an account level, at an individual customer level, or to a specific use case. Over successive iterations, each individual use case can have it own profile or sub-profile created that documents how the customer's needs and preference have evolved over time. The SVS can further generate a "current stance" on each topic by applying logic to synthesize the various signals on that topic, weighting on frequency, recency and relevance. These current stances can be used as inputs into heuristics, algorithms and other artificial intelligent engines to assign vehicles to members and to generate vehicle suggestions.

Vehicle Suggestion List Generation

If the evaluation engine generates one or more vehicle suggestions 335, the suggestions may be evaluated by the SVS and accepted or rejected, and/or the vehicle suggestions may be presented to the customer and either accepted or rejected. The SVS may reject the vehicle suggestions for a variety of reasons, such as the list being too long, or the list being inconsistent with other parameters that may exist in the information as a few non-limiting examples. The customer may also reject the vehicle suggestions if none of the available suggestions is satisfactory or desired. If the generated one or more vehicle suggestions is not acceptable 340, the SVS augments the information in the system based on the rejection of the vehicle suggestions 345 and/or may initiate a process to obtain additional information 345. As a non-limiting example, the SVS may slightly decrease the value attributes for each of the attributes that are common to the vehicles in the vehicle suggestion list, decrease all of the value attributes associated with each of the vehicles in the vehicle suggestion list, decrease the value attributes for value attributes associated with vehicles in the vehicle suggestion list that fall below a threshold value, skewing the value attributes, etc. The SVS may then also regenerate the metrics 350. The SVS then continues to evaluate the request 325 to process the outstanding customer request.

If the vehicle suggestions are accepted by the SVS, then they are presented to the customer. If the customer accepts one of the suggestions, then the SVS uses this information to augment the profile information and then regenerates metrics 310 and then waits for the next event to be received 315. The SVS may augment the information in a variety of manners. A few non-limiting examples include increasing the value attributes that are associated with the selected vehicle, increasing the value attributes that are uniquely associated with the selected vehicle, decreasing the value attributes that are uniquely associated with the non-selected vehicles, etc.

Once the process begins with the creation of the initial profile, the process can run indefinitely attempting to approach a maximum value of certainty in the generation of vehicle suggestions. The value of certainty can be measured by the number of vehicle suggestions generated in response to a customer request, the number of rejections from the SVS and/or the customer, and the number of successful hits obtained by the customer accepting one of the vehicle suggestions as a few non-limiting examples. Other information sources may also be used to measure the value of certainty, such as soliciting direct feedback from the customer through push requests, customer satisfaction surveys, etc.

If the value of certainty drops below a specific threshold, such as X number of rejections in a row or a percentage of rejections averaged over a period of time or over a number of vehicle suggestions, the SVS can initiate a recovery operation. In some embodiments, the recovery operation may involve rolling back the profile information, metrics, value attributes, etc., to a point in time that the value of certainty was at an acceptable level or an optimal level and then continue with the process from that point. In other embodiments, the SVS may roll back to the initial profile in an attempt to recover. The SVS can maintain a list of the questions previously posed, campaigns initiated and information gathered and actively avoid all or subsets of the steps that were employed in reaching the low threshold value of certainty. If the SVS determines that the value of certainty has reached an upper threshold, the SVS can stop or limit further collection of information and metric generations in an attempt to maintain the current value of certainty.

In some embodiments, another threshold value may be utilized to establish a hysteresis for the value of certainty. For instance, when the value of certainty reaches an upper threshold, the SVS may limit or stop further data collections. If the value of certainty drops below another threshold, the SVS may resume data collection and metric generation.

The described aspects and functionality of the SVS are advantageous for the operator of the SVS as well as the customers. One such advantage is that the SVS can operate to reduce the cost of providing the subscription vehicle service. This advantage can at least be realized in the fact that the service provider, having full knowledge of the vehicle fleet, including the locations, operational costs, wear and tear and maintenance schedules, etc., coupled with knowledge of the domain of customers that have subscribed to the service, can not only generate vehicle suggestions based on the user oriented metrics, but also based on the cost to deliver the vehicles and the risk associated with having to implement an emergency exchange out. Further, the SVS system, through the use of artificial intelligence, increases the value of certainty such that customer satisfaction can be improved, thus creating an affinity with the customer base as well as gaining new customers by word of mouth from satisfied customers.

Another advantage is that the SVS can operate to tweak the service pricing and monitor the results that are incurred. For instance, if a particular customer is frequently switching between a higher cost vehicle and a lower cost vehicle, the cost for providing the service can be increased. In such circumstances, as a non-limiting example, the SVS can lower the cost of the higher cost vehicle and raise the costs associated with the lower cost vehicle. The SVS can then monitor the activity of the customer to determine if the adjustments result in reducing the frequency of swaps, reducing or increasing the income generated by affecting the activity of the customer or has other effects. If the desired affect is not achieved, other tweaks can be implemented and monitored.

Further, the service provider can also determine if certain customers are susceptible to being encouraged or enticed by promotional activities or pushes. For instance, if the SVS identifies a vehicle suggestion list, the SVS can include one or more additional suggestions at a reduced price in an attempt to entice the customer to select an otherwise non-optimal vehicle that may be more cost effective for the service provider to deliver or, that is more readily available (ie., such as a inventory item that has set idle for a prolonged period of time). Further, the SVS can provide future incentives to entice a customer to presently select a higher cost vehicle that is available and that can be delivered at a lower cost to the service provider, in exchange for receiving a discount on future selections.

Figure 2:
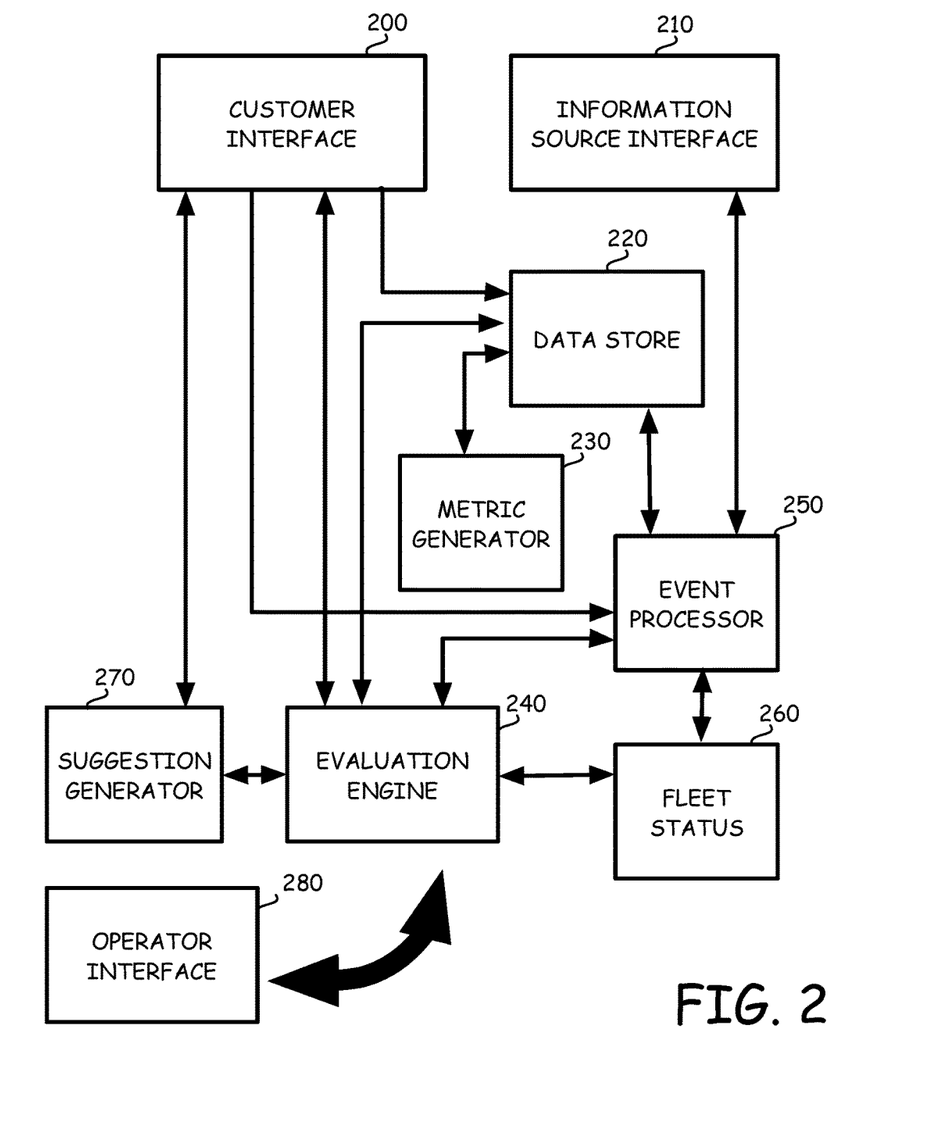
FIG. 2 is a block diagram illustrating functional operations of an exemplary embodiment of the SVS.

FIG. 2 is a block diagram illustrating functional operations of an exemplary embodiment of the SVS. It should be appreciated that the particular breakdown of the various functional blocks is only provided for an overall functional understanding of an exemplary embodiment and is not intended to illustrate an actual structural or architectural restriction on various implementations. For instance, the functionality in one illustrated block may actually be performed or implemented by multiple systems that are geographically dispersed, multiple modules in the same computing system, or multiple software flows in the same executable software element. In addition, functionality that is illustrated in separate blocks may actually be incorporated into the same software or hardware module. Thus, those skilled in the art will appreciate that the presented structure is simply provided to assist in the understanding of the overall functionality of an exemplary embodiment.

The functional block diagram illustrates a customer interface 200 and an information source interface 210. The customer interface 200 enables the SVS to interact with a customer that is registering to utilize the SVS, providing initial information for the creation of the customer and account profile, present vehicle suggestions from the SVS, as well as receive and respond to requests for additional information, provide feedback to the system and interact with the SVS for requesting vehicles and vehicle swaps, as well as a variety of other functionality as is presented in the above-incorporated applications.

The data store 220 is utilized as a database or storage medium for information that is acquired and/or utilized by the SVS. For instance, the initial profile information received through the customer interface 200, as well a augmentations thereto can be stored within the data store 220. In addition, the data store 220 can provide storage for generated metrics, including but not limited to use cases and value attributes, historical interactions such as prior suggestions and responses from the customer to such suggestions, customer feedback, or the like.

The information source interface 210 enables the SVS to interact with external systems, databases or other sources of information to further gather and/or augment the profile information and to obtain other information that can be utilized in the generation of metrics, evaluation of vehicle requests and other events and the generation of vehicle suggestions.

Periodically, the SVS will generate metrics as described in FIG. 1 for the metric generating events 310 and 350. The metric generator 230 receives input from the data store 220 in support of generating the metrics. As previously describe, the metric generator 230 relies not only upon the information in the data store 220 but also a set of algorithms and/or heuristics to analyze the available information for the generation and/or augmentation of value attributes, the generation and/or augmentation of use cases as well as identifying information deficiencies and providing input for generating events to gather further information. The metric generator 230 may also receive input directly from a system operator, the customer interface 200, the information source interface 210 as well as operate in conjunction with the evaluation engine 240 in generating the metrics.

The event processor 250 operates to receive and interpret various events that may be received by or occur in the SVS. The event processor 250 may receive events directly from the customer interface 200, such as a vehicle swap request, feedback, queries regarding vehicle availability, etc. In addition, the event processor may receive events that are triggered by the metric generator 220, the evaluation engine 240, the fleet status 260, the information source interface 210 or any other source or generator of an event in the SVS that needs to be processed. If an event received by the event processor 250 is a request for a vehicle or a vehicle swap, the event processor 250 can operate to trigger the evaluation engine 240 to generate a vehicle suggestion list (see processes 320 and 325 of FIG. 1). If the evaluation engine 240 determines that additional information is required or that additional information may be useful to generate a more optimum vehicle suggestion list, the evaluation engine 240 may trigger a campaign event for obtaining such further information by invoking such an event. The event processor 250 would operate on this event in any of the variety of manners describe in connection with processes 330 and 345 of FIG. 1. The fleet status may also result in triggering various types of events. For instance, as an operator updates the SVS through the operator interface 280, the operator can enter changes to the fleet, such as the addition of new vehicles, removing of sold assets or tagging assets as unavailable due to delivery or maintenance, etc. This information may then result in the generation of events to collect more information, modify information, regenerate metrics, etc.

The operator interface 280 may include a terminal access to the SVS, Internet access, mobile access through a browser or a resident app, messaging, etc. Through the operator interface 280, one or more operators can interact with most elements or functional capabilities of the SVS to provide further input or control. For example, the operator can directly interact with a customer by the operator interface 280 providing direct access to the customer through the customer interface 200. Such access could be in the form of messaging, push notifications, chatting, etc. Through the operator interface 280, the operator may also be able to review the information available in the data store 220, monitor, augment or control the operation of the metric generator 230, directly trigger events for the event processor 250, review/modify/reject vehicle suggestions from the suggestion generator 270, enable/disable/modify the various heuristics/algorithms of the evaluation engine 240, etc.

The evaluation engine 240 primarily analyzes the available data to provide input to the suggestion generator 270 and/or generate events for the event processor 250. The heuristics and algorithms utilized by the evaluation engine 240, as well as the metric generator 230, can be quite varied and are dynamically adjusted. As a previously stated goal of the SVS, customer satisfaction is of significant importance. The customer satisfaction can be measured in a variety of manners and the afore-mentioned value of certainty is only one such measure. Customer surveys, customer retention, expansion of customer base, level of customer interaction, was all as other metrics are all tangible and definable measures that can be used to determine if customer satisfaction is being achieved. Thus, as the system is deployed and operates in the field, new heuristics, rules and algorithms can be developed, deployed and monitored to see if the customer satisfaction metrics are beneficially or adversely affected. Based on these results, additional changes may also be implemented. In addition, the ability for customers to provide free from entry of information can also be used to generate and/or modify the heuristics, rules and algorithms. As a non-limiting example, the SVS can detect a trend of customers providing queries with regards to the miles per gallon ratings for vehicles, the volume of the gas tanks and the fuel efficiency. If such requests tend to be at a heightened level of frequency from customers that are swapping out for vehicles for long trips, the SVS may modify the operation of the evaluation engine to identify the number of miles that a vehicle or a class of vehicles will average between having to stop for refueling. As such, the heuristics may operate to generate a value attribute associated with the average distance between refueling then include consideration of other parameters, such as schedule, type of use (vacation or business trip), etc., as well as the new value attribute in evaluation a vehicle change request. It should also be appreciated that the artificial intelligence aspect of the SVS can be used to provide valuable information to the SVS operator. For instance, if the distance between fueling value attribute is trending towards a heightened level of importance, the SVS can provide operator notice to evaluate an expansion or modification of the fleet to include an increased number of vehicles with higher distance between refueling parameters or, modify some of the existing or upcoming expansions to the fleet to include auxiliary fuel tanks.

Vehicle Suggestion Scoring

If the evaluation engine generates one or more vehicle suggestions, each individual suggestion can be included or excluded from a vehicle suggestion list. Given a fleet of vehicles, an individual flip request, and the accumulated or available information to the SVS, each potential suggestion (customer-vehicle pairing) can be evaluated to determine or predict the customer satisfaction level or the fit of the suggestion. It should be appreciated that in some embodiments, a single score may be derived for each potential pairing but in other embodiments, a multifaceted or multi-variable score can be generated. In the latter embodiment, if a list of potential pairings have multi-variable scorings, then depending on circumstances, situations, etc., that may results in the application of different weightings to the variables, the ranking of the suggestions may change. As a non-limiting illustrative example, suppose that the pairings are scored based on the following variables or criteria: aesthetic customer satisfaction, performance customer satisfaction and SVS cost effectiveness. In this example, if a customer flip is purposed for a date or entertaining of a client, then more weight can be attributed to the aesthetic customer satisfaction variable over the performance customer satisfaction and the SVS cost effectiveness. However, if the customer is requesting the vehicle flip for taking a business trip or going on vacation, then the performance customer satisfaction variable may be attributed more weight. Similarly, if the SVS is not being profitable, then more weight can be attributed to the cost effectiveness of the pairing. Thus, it will be appreciated that a single scoring or any level of granularity in the scoring can be utilized in various embodiments and differing circumstances.

In generating each suggestion, the SVS first receives and evaluates input data to define meets and bounds for generating the suggestions, then applies a methodology cull the list of potential pairings down including filtering, scoring and refining the suggestions, and finally generating a satisfaction score for each potential pairing of a customer with a vehicle.

The suggestion generator 270 responds to input from the evaluation engine 240 to identify vehicles that match the customer's vehicle request in view of the customer request and the information acquired as well as the value attributes etc. Thus, the suggestion generator 270 includes various flip request parameters in identifying a suggestions, such as but not limited to, the flip date, the use case and flip preferences such as vehicle attributes, etc. In addition, the suggestion generator may include a wide variety of additional information include the information available in the member profile.

This information may include demographic data regarding the customer (i.e., daily commute, driving habits, parking restrictions, etc.) and simply preferences provided by the customer or detected by the system based on interaction with and observations of the customer (i.e., style of vehicle, color of vehicle, interior amenities and features, etc.). The suggestion generator 270 may also consider vehicle data obtained from or or pertaining to the customer that has been collected as a result of past activity. This information may include, but is not limited to, the number of flips or possessions, the average time between flips, satisfaction feedback from the customer regarding particular vehicles, flip ratings per breed per segment, usage history, personal score/ratings provided by the customer either on its own or through being prompted, luggage requirements, amenities selected (i.e. DVD, GPS Navigation, BlueTooth, etc.), typical terrain that is to be traversed etc. In addition, customer preferences, such as make/model (i.e., likes German cars), usages (i.e., camping, long trips, etc.), special requirements (i.e., tow hitch, luggage rack, etc.), seating requirements etc. The suggestion generator 270 may also obtain and consider information obtained from other or external sources, such as weather, customer driving records and infractions, vehicle telematics data pertaining to the customer, insurance information, scheduling information, etc. Telematics is a method of monitoring a vehicle. By combining a GPS system with on-board diagnostics it's possible to record—and map—exactly where a car is and how fast it's traveling, and cross reference that with how a car is behaving internally. Vehicle telematics are used in a wide range of industries including insurance, fleet management, driver monitoring etc. The technology enables the tracking of driving habits, driving styles, alertness, aggressiveness, law compliance, etc. The telematics data can be used to augment a customer profile by monitoring how a driver responds with various vehicles and then updating the profile information accordingly. For instance, if an increase in driving time is experienced for a particular vehicle but no other changes for the customer has occurred, it can be projected that the customer enjoys driving the current vehicle. Driving characteristics may also indicate if a driver is comfortable or edgy in a particular vehicle.

The system that is received and evaluated by the suggestion generator 270 can result in a large number of potential pairings that must be evaluated. The related and concurrently filed United States patent application, bearing the title of SYSTEM AND METHOD FOR ALLOCATING VEHICLES ACROSS A POOL OF CUSTOMERS IN A SUBSCRIPTION VEHICLE SERVICE presents a description of methods that can be utilized in scoring or identifying preferred pairings for the suggestion generator 270. In this application, it was illustrated how generating assignment scenarios based on the number of customers in a forecast and the number of vehicles available to select from could result in an unmanageable number of matches. As such, the application presented techniques for culling the list of potential scenarios. The present disclosure operates similarly but on a different scale. For instance, rather than applying rules to limit the domain of potential pairings, the present disclosure focuses on valuing the various pairings such that only the highest scoring pairings need to be considered.

For instance, in the most simplified version of the model, a score can be attributed to each customer-vehicle pairing, wherein the score correlates with the customers experience or satisfaction with the pairing. Thus, the number of scores in the system would equate to the number of vehicles in the fleet times the number of members. However, filtering can be applied prior to triggering the operation of the suggestion generator 270

The domain of potential vehicles to be evaluated for a flip can be culled by removing vehicles based on flip preferences, member preferences and the wide variety of information provided as input or made available to the SVS. Thus, the more information that can be gathered by the system has a direct effect on the number of vehicles that must be considered by the suggestion generator 270.

After vehicles are eliminated from pairing consideration, the remaining pairings can be individually ranked. The related and concurrently filed United States patent application, bearing the title of SYSTEM AND METHOD FOR ALLOCATING VEHICLES ACROSS A POOL OF CUSTOMERS IN A SUBSCRIPTION VEHICLE SERVICE presents a description of a process for ranking assignment scenarios which include pairing matches across a pool of users and then assigning rankings or scores to the various scenarios to identify an optimal scenario. In this disclosure, the same rules can be applied on an individual pairing level. Thus, the final results of the operation of a system or method employing the present embodiments could be utilized by the scoring of assignment scenarios as well.

Each of the pairings for a given customer can be analyzed based on various factors and be assigned scores, weighted points, etc. for one or more categories. Once each of the pairings is thus analyzed, they can then be ranked or sorted based on the values associated with the various one or more categories. For instance, in one embodiment each pairing may receive a score for the expected customer satisfaction or experience for the pairing, the revenue to be generated or cost implications for the pairing and the optimization of vehicle assignments. The scores may be calculated in a variety of manners for each of these, as well as other categories. For instance, the expected customer satisfaction score may be based on the value attributes matching between the customer and the vehicle.

The value attributes as described above in connection with table 1 are also beneficial in the elimination vehicles by applying a score to pairings. For instance, if a particular value attribute is listed as having a high weight from a customer's perspective, the suggestion generator 270 can presume that any vehicles that do not include the value attribute will naturally result in generating a lower score and thus, be eliminated as a potential pairing. As such, the vehicle can be limited in advance from consideration in the process. One technique to create a score for a pairing is simply to sum the total number of matching value attributes between the customer and the vehicle. For instance, the following application of Table 1 above illustrates one technique for generating a score for pairing 1, pairing 2 and pairing 3.

| Attribute | Customer Profile Information | Value Attribute | Pairing 1 | Pairing 2 | Pairing 3 |
| --- | --- | --- | --- | --- | --- |
| Color | White, black, tan | 80 | 80 | 80 | 80 |
| Number of doors | 4 | 100 | 100 | — | 100 |
| 0 to 60 rating | — | 50 | 50 | 50 | 50 |
| Occupancy | 5 | 100 | 100 | 100 | 100 |
| Safety rating | Highest | 90 | 90 | 90 | 90 |
| Fuel Efficiency | Minimum of 20 mpg | 90 | 90 | 90 | 90 |
| Handless entry | Yes | 90 | 90 | 90 | 90 |

-continued

| Attribute | Customer Profile Information | Value Attribute | Pairing 1 | Pairing 2 | Pairing 3 |
|---|---|---|---|---|---|
| Storage capacity | High level | 90 | 90 | 50 | 90 |
| Rear seat DVD displays | Required | 100 | — | — | — |
| Convertible | No | 0 | — | — | — |
| Moon roof | — | 50 | — | — | — |
| Automatic | Yes | 100 | — | — | 100 |
| Manual | No | 0 | 0 | 0 | 0 |
| Blue Tooth Equipped | Yes | 90 | 90 | 90 | 90 |
| Score | | | 1010 | 640 | 1110 |

In this example, the Value Attributes of the customer are presented in value attribute column. For each vehicle in the three pairings, the value attributes that match up with the customer value attributes are listed and then summed for creating the score. In the illustrated example, pairing 3 has the highest score of 1110, closely followed by pairing 1 with a score of 1010 and pairing 2 has the lowest score of 640. Thus, in this example pairing 2 could be eliminated from consideration.

The revenue generated for a particular pairing can be expressed in absolute numbers or in relative numbers, such as deltas from a desired performance level. The revenue generated for the various pairings can fluctuate based on a variety of factors. For instance, if incentives are offered to a customer to increase the customer satisfaction for sub-optimal vehicle pairing, the revenue may decrease. However, if a customers is upsold on upgraded vehicles, then the revenue may increase. In addition, an expected revenue amount may be assumed for each flip but, a given flip may end up running above or below the expected amount. Thus, each of the pairings can be given a score based on the amount of revenue they generate or the cost they impose to the service provider.

The vehicle optimization of a pairing may also be considered. For instance, if a vehicle pairing results in a vehicle for which maintenance is due, the scoring can be greatly reduced, whereas the scoring for a vehicle that is up to date on maintenance may be higher.

Another metric that could be used in analyzing the pairings is the consideration of other variables, such as the locations of vehicles and the complexity of the flips, the amount of preparation of a vehicle and the travel time to perform a flip, as well as constraints to flip sequencing. Other variables could also be considered and these particular variables are presented only as non-limiting examples.

As previously described, the cost implications of a pairing may be considered and, the costs associated with flips are one such implication. However, many other metrics are also associated with flips and they may be used as input for ranking the various scenarios. For instance, the location of vehicles and the logistics of the flips may be considered. Each flip may be ranked by the distance between the two vehicles or the distance between the desired vehicle and the customer. Further, the flips may be ranked also based on the amount of preparation or maintenance that is required as well as the travel time to conduct the flip. For instance, if a particular vehicle that is being flipped to another customer was damaged or had excessive wear or soiling by the previous customer, the vehicle may be subject to significant preparation time to get it ready for the flip. In addition, the employees that are performing the flip may have to travel a significant distance in taking requested vehicles to a customer.

Further, pairings may be ranked based on the efficiency of implementing the required flips. If a particular pairing results in a long sequence of other flips in order to implement the requested flip, the amount of time required to implement the request may result in the pairing being undesirable and thus having a low score.

Even further, pairings may be evaluated simply by the number of flips required. Thus, pairings that can be implemented with a minimal number of flips may be ranked higher than pairings that include a larger number of flips. In addition, some flips for some customers may be easier to perform than other flips. Thus, if a customer presently in possession of a vehicle destined for another customer typically does not show up for a flip, frequently reschedules flips or even cancels them, the knowledge of such customer having possession of the desired vehicle may be used to lower the ranking of the pairing.

Thus, applying these actions, as well as others that will be apparent to those of ordinary skill in the art, can result in creating various rankings of the pairings, either as a whole or categorically. The pairings can then be sorted based on the ranking values in one or more of the categories. Further, some categories may be determined to be more important than other categories. For instance, customer satisfaction may be considered to be more important than the total amount of expected time to implement a pairing. The SVS can then assign a higher score to one or more pairings based on the desired characteristics of the pairings.

The pairings may be further analyzed and score adjusted based on a feedback loop with the customer and other sources. One of the techniques that can be employed to perform this adjustment is to interact with the customers through the provision of customer prompts that can iteratively improve the ranking of a pairing. For instance, the system can provide incentives to increase customer satisfaction in vehicle pairing. Thus, if a particular flip in a scenario has a low expected customer satisfaction, an incentive can be offered to the customer to increase the expected customer satisfaction and thus increase the score for the pairing.

In addition, similar to techniques for contacting and soliciting information from a customer may be employed by the SVS in scoring the pairings. For instance, a particular pairing for Customer A may be attributed with an increased scoring if the vehicle that would be surrendered by Customer A would have a high ranking for being assigned to Customer B.

The suggestion generator 270 may operate in conjunction with the status obtained from the fleet status in finalizing a suggestion list for vehicle request or vehicle swaps. The vehicle suggestion list is also fed back to the evaluation engine for reviewing the list and either culling the list down based on current information or obtaining additional or augmented information through initiating an event. Further, the suggestion generator 270 can be set up with parameters to automatically cull the list of vehicle suggestions such as by limiting the list to a certain number of suggestions, eliminating certain suggestions from the list based on thresholds of similarity to other items, etc. For instance, equivalent cars are generally available from Chrysler, Plymouth and Dodge, as well as Chevy and Oldsmobile. The suggestion engine can eliminate such equivalents to provide greater variety in the vehicle suggestion list.

The suggestion list may take on a variety of forms and be utilized not only as a presentment of options to the customer, but also as a tool to efficiently assign vehicles. As a non-limiting example, a suggestion list may include the elements as presented in TABLE 2.

TABLE 2

Example Suggestion List

| Vehicle | Match Rating | Cost |
| --- | --- | --- |
| Ford F-150 Crew Cab | 95% | $350 |
| Toyota Tundra | 85% | $325 |
| Ford F-250 Crew Cab Diesel | 80% | $275 |
| Lincoln Navigator | 75% | $300 |
| Ford Bronco | 75% | $300 |

In the illustrated example, the vehicle list could be presented as is or with further detail. In addition, each entry may include a link to a page that provides further detail regarding the vehicle. The match rating is an indication of the appropriateness of the suggested vehicle in view of the evaluation of the profile information. Such a rating could be based on the number of attributes that match with the suggestion, weighted by the value attributes and the particular request. Thus, the process of analysing the customer request may include applying a series of heuristics to identify vehicles that match the metrics, such as the value attributes and/or use cases, and then ordering the vehicles based on the value of the match and the availability of the vehicles in the inventory. The vehicle suggest list may then be culled by selecting the vehicles that have the highest value of the match, such as a match that exceeds a minimal threshold, or selecting only a specific number of the vehicles such as the top 5 or 10 or X.

The suggestion list may also include a cost associated with the vehicle selection such as the monthly, weekly, daily recurring cost, the cost for a request period of time etc. It should be appreciated that use of a suggestion list of this form can be utilized to entice a customer to select a sub-optimum vehicle by providing a decrease in the cost. As illustrated in the example, if the operator is having difficulty in placing the Ford F-250 diesel, the cost associated with that particular vehicle can be reduced as an incentive to the customer to relax on the customer's requirement in order to attain the cost savings. In such a scenario, the customer reaps the benefit of the cost savings and the operator is able to utilize an under utilized vehicle in the fleet.

Figure 3:
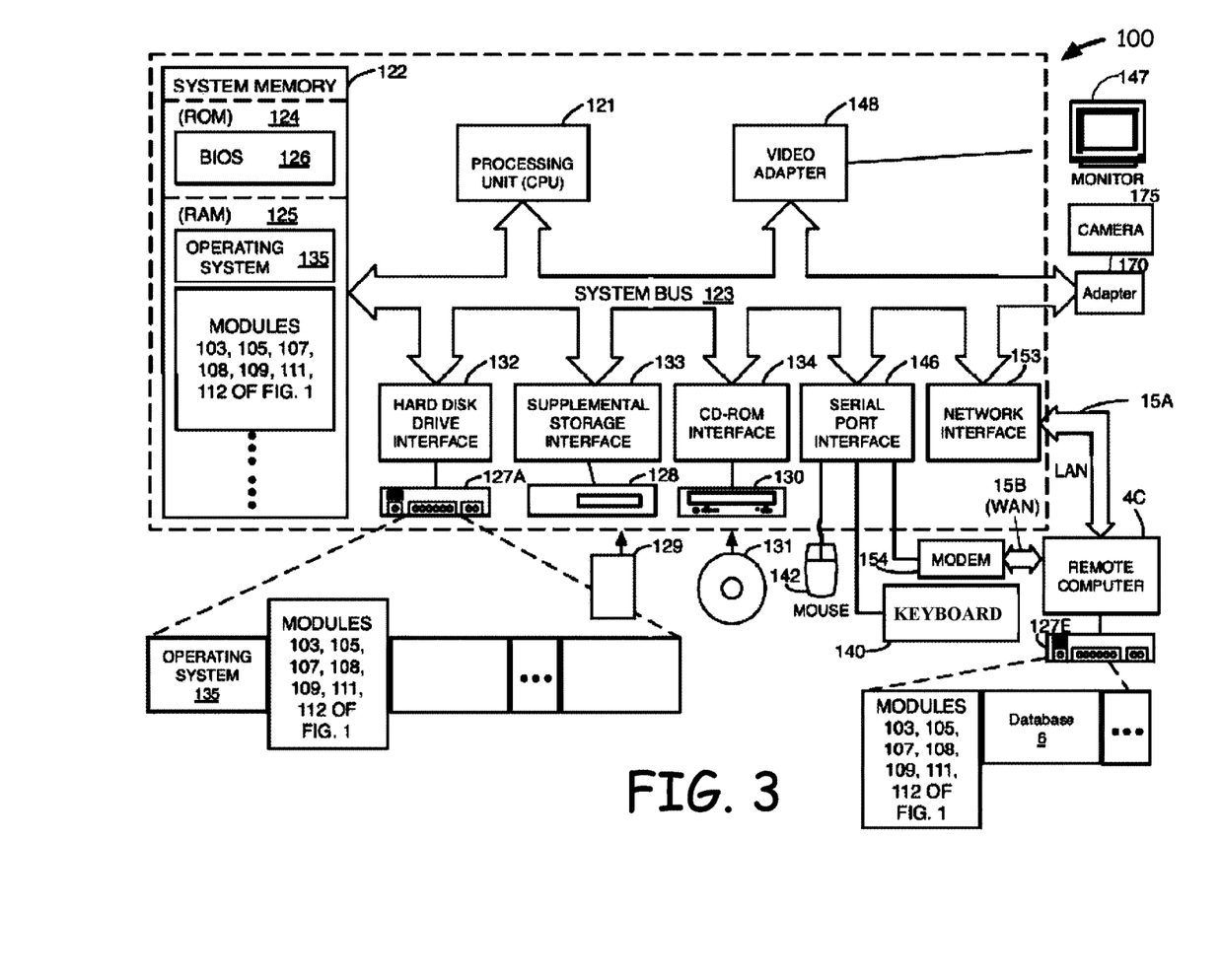
FIG. 3 is a functional block diagram of one exemplary embodiment of a computing system that may form one of the system components of the SVS.

FIG. 3 is a functional block diagram of one exemplary embodiment of a computing system that may form one of the system components of the SVS. The illustrated system, as well as each of the components may be a physical machine in a physical environment or a virtual machine instance running in a virtual private cloud provided by a commercial cloud-computing provider, associated with any component of the system of the present disclosure. One of ordinary skill in the art understands that the written description associated with FIG. 3 may be applicable to any system component described as running system content, applications, tiers, programs, process flows, methods, etc. For example, one of ordinary skill in the art will recognize that the SVS in combination with the computing system of FIG. 3 may support a virtualized environment. That is, the SVS may execute the software of this disclosure in a virtualized environment where a virtual machine is running on a hypervisor that is supported across a number of physical machines. However, other configurations besides the virtualized environment are possible and are included within the scope of this disclosure.

Referring again to FIG. 3, the computing system, or server 100, may comprise a processing unit 121, a system memory 122, and a system bus 123 that couples various system components including the system memory 122 to the processing unit 121. The system bus 123 may comprise any of several types of bus structures including a memory bus or memory controller, a peripheral bus, and a local bus using any of a variety of bus architectures. The system memory may comprises a read-only memory (ROM) 124 and a random access memory (RAM) 125. A basic input/output system (BIOS) 126, containing the basic routines that help to transfer information between elements within computer 120, such as during start-up, is stored in ROM 124.

The server 100 may comprise a hard disk drive 127A for reading from and writing to a hard disk, not shown, a supplemental storage drive for reading from or writing to a removable supplemental storage 129 (like flash memory and/or a USB drive) and an optical disk drive 130 for reading from or writing to a removable optical disk 131 such as a CD-ROM or other optical media. Hard disk drive 127A, magnetic disk drive 128, and optical disk drive 130 are illustrated as being connected to system bus 123 by a hard disk drive interface 132, a supplemental storage drive interface 133, and an optical disk drive interface 134, respectively.

Although the exemplary environment described herein is illustrated as employing hard disk 127A, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet-connected devices such as in a portable devices and/or personal digital assistants (PDAs).

The drives and their associated computer readable media provide nonvolatile storage of computer-executable instructions, data structures, program modules, and other data for computer or client devices. A number of program modules may be stored on hard disk 127, magnetic disk 129, optical disk 131, ROM 124, or RAM 125, including, but not limited to, an operating system 135 as well as various modules and routines as presented in FIG. 2, as well as the various heuristics, algorithms and data. Program modules comprise routines, sub-routines, programs, extendable objects, components, data structures, etc., which perform particular tasks or implement particular abstract data types. Aspects of the present invention may be implemented in the form of a downloadable, client-side, application modules, which are executed by server 100 in order to provide the functionality described herein.

A user may enter commands and information into server 100 through input devices, such as a keyboard 140 and a pointing device 142. Pointing devices may comprise a mouse, a trackball, and an electronic pen that may be used in conjunction with an electronic tablet. Other input devices (not shown) may comprise a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), wireless interface such as WIFI or BlueTooth, or the like. Likewise, the user can enter commands through a browser type interface running on a separate computer, laptop, handheld device, etc., that connects to the server 100 through a LAN 15A, WAN 15B or other interface.

The display monitor 147 may also be connected to system bus 123 via an interface, such as a video adapter 148. The display 147 may comprise any type of display devices such as a liquid crystal display (LCD), a plasma display, an organic light-emitting diode (OLEO) display, and a cathode ray tube (CRT) display.

A camera 175 may also be connected to system bus 123 via an interface, such as an adapter 170. The camera 175 may comprise a video camera such as a webcam. The camera 175 may comprise a CCD (charge-coupled device) camera or a CMOS (complementary metal-oxide-semiconductor) camera. In addition to the monitor 147 and camera 175, other peripheral output devices (not shown), such as speakers and printers may also be communicatively coupled to the server 100.

Server 100 may operate in a networked environment using logical connections to one or more remote computers, such as a web server. A remote computer may comprise another personal computer, such as another server 4C, a portable computing device, a router, a network PC, a peer device, or other common network devices. While the web server 4C or a remote computer typically comprises many or all of the elements described above relative to the server 100, only a memory storage device 127E has been illustrated in FIG. 3. The logical connections depicted in FIG. 3 comprise a local area network (LAN) 15A and a wide area network (WAN) 158. Such networking environments are commonplace in offices, enterprise wide computer networks, intranets, and the Internet.

When used in a LAN networking environment, server 100 is often connected to the local area network 15A through a network interface or adapter 153. When used in a WAN networking environment, server 100 typically comprises a modem 154 or other means for establishing communications over WAN 158, such as the Internet. Modem 154, which may be internal or external, is connected to system bus 123 via serial port interface 146. In a networked environment, program modules depicted relative to the server 4C, or portions thereof, may be stored in the remote memory storage device 127E. It will be appreciated that the network connections shown are exemplary and other means of establishing a communications link between server 100 and other devices may be used.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network (such as communications-network 15A, for example). In a distributed computing environment, program modules may be located in both local and remote memory storage devices.

In one exemplary embodiment, one or more extendable objects, applications, programs, system processes, method steps, etc. of the system of the present disclosure may be stored in the memory 112 as computer program instructions. In one exemplary embodiment related to the functional diagram of FIG. 2, the server 100 may execute, at least partially, one or more of the functional blocks.

Certain steps in the exemplary processes, process flows, and/or methods described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in the art of programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer readable medium. Computer-readable media comprise both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for a computer system specifically configured to provide a subscription vehicle service that ranks the pairings of vehicles, selected from a fleet of vehicles, with a requesting customer, the method comprising:
  maintaining a fleet of vehicles available for pairing with a plurality of customers;
  installing telematics devices in each of the vehicles of the fleet of vehicles;
  the computer system maintaining an inventory list of the vehicles that are available in the fleet of vehicles for pairing with the plurality of customers;
  the computer system maintaining a customer profile for each of the plurality customers, wherein each of the plurality of customers has a customer profile that includes customer provided values for one or more desired vehicle attributes;
  for one or more of the plurality of customers, dynamically and reiteratively:
    the computer system receiving telematics data over a global network from one or more vehicles that have been used by a particular customer or that are currently being used by the particular customer;
    the computer system receiving communications from the particular customer in response to the computer system sending an information solicitation to the particular customer over the network; and
    the computer system augmenting the customer profile of the one or more plurality of customers based on the received telematics data and the received communications;
  for each particular customer of the plurality of customers the computer system generating a table of weighting values for each of a plurality of vehicle attributes by applying rules to the particular augmented customer profile;
  the computer system receiving a vehicle request over the network from a first customer using a first customer device, the vehicle request identifying one or more requested vehicle attributes and an identified period of time that the first customer wants a vehicle;
  the computer system further augmenting the weighting values for the first customer based on the first customer request;
  the computer system filtering vehicles from the inventory list of vehicles by eliminating vehicles that are scheduled for maintenance during the identified period of time;
  the computer system selecting vehicles from the filtered inventory list of vehicles by summing the weighting values of the attributes for each of the vehicles in the filtered inventory list of vehicles that correspond to the attributes in the table of weighting values for the first customer to create a score and then selecting the vehicles with the highest score to create a vehicle selection list that includes a ranking of pairings for the first customer;
  the computer system delivering the vehicle selection list that includes at least a subset of the ranked pairings to the first customer's customer device over the global network;
  the computer system receiving over the global network a selection of one of the vehicles presented to the first customer;
  the computer system initiating the delivery of the selected vehicle to the first customer;
  the computer system updating the inventory to remove the selected vehicle; and
  the computer system further augmenting the weighting values based on the first customer selection.

2. The method of claim 1, wherein the action of selecting vehicles from the filtered list of vehicles inventory further comprises filtering out vehicles that do not have a minimum number of vehicle attributes in common with the desired vehicle attributes and the requested vehicle attributes.

3. The method of claim 2, further comprising the action of modifying the score for a particular vehicle based on the cost associated with delivering the particular vehicle to the customer.

4. The method of claim 3, further comprising the action of modifying the score for a particular vehicle based on the maintenance schedule information for the particular vehicle.

5. The method of claim 2, wherein the action of delivering a vehicle selection list that includes at least a subset of the selected vehicles to the first customer on the customer device over the global network further comprises delivering a vehicle selection list that includes vehicles that have a score sum that exceeds a particular threshold value and for each of the vehicles, presenting a link to a page that provides further detail regarding the vehicle.

6. The method of claim 1, wherein the action of assigning a score to one or more of the selected vehicles based at least in part on the level of commonality between the desired vehicle attributes and the requested vehicle attributes with the actual attributes of the selected vehicle further comprises incrementing the score for each commonality.

7. The method of claim 1, wherein the action of selecting vehicles from the filtered list of vehicles inventory further comprises filtering vehicles that are within a threshold period of time of requiring maintenance or are highly suited for being paired to a different customer.

8. A subscription vehicle service system configured to rank the pairings of vehicles selected from a fleet with a requesting customer, the system comprising:
  a fleet of vehicles available with each of the vehicles in the fleet of vehicles including a telematics devices installed therein;
  a computer system including a processing unit and a memory element with computer instructions that when executed by the processing unit causes the computer system, for one or more of a plurality of customers, to:
    present a user interface to a particular customer device over a global network, wherein the user interface is configured to solicit and receive an initial set of information from a particular customer associated with the particular customer device for creating a customer profile for the particular customer, wherein the initial set of information includes one or more desired vehicle attributes for the particular customer;
    receive telematics data over a global network from one or more vehicles that have been used by the particular customer or that are currently being used by the particular customer;
    receive communications from the particular customer in response to the computer system sending an information solicitation to the particular customer over the network; and
    augment the customer profile of the particular customer based on the received telematics data and the received communications;

the computer system further configured to generate a table of weighting values for each of a plurality of vehicle attributes based on the augmented customer profiles;

an event processor configured to receive over the global network an event from the particular customer device and determine if the received event is a customer request for a vehicle including the identification of a period of time that a vehicle is requested;

if the received event is a customer request for a vehicle, the computer system is further configured to analyze the customer request for a vehicle in view of the profile and of the current inventory list of vehicles available;

the computer system is further configured to invoke a filter configured to exclude vehicles from the current inventory list of vehicles by eliminating vehicles that are scheduled for maintenance during the identified period of time;

the computer system further configured to assign a score for each of the vehicles in the filtered inventory list of vehicles by summing the weighting values of the attributes for each of the vehicles in the filtered inventory list of vehicles that correspond to the attributes in the table of weighting values for the customer and selecting the vehicles with the highest score;

the computer system further configured to generate a vehicle suggestion list comprising one or more vehicles, wherein the one or more vehicles are selected based on the value of the score;

the computer system further configured to rank the one or more vehicles and customer pairs based at least in part on the score;

the computer system further configured to transmit over the global network at least a subset of the suggestion list to the particular customer's customer device;

the particular customer device configured to receive a selection from the particular customer and transmit the selection over the global network to the computer system;

the computer system configured to invoke the delivery of the selected vehicle to the particular customer.

\* \* \* \* \*